Nov. 7, 1939.    O. SCHMUTZ ET AL    2,179,353

VOLTAGE STABILIZING NETWORK

Filed March 20, 1937

WITNESSES:
C. J. Weller.
F. E. Hardy

INVENTORS
Oskar Schmutz and
Otto Werner.
BY Ezra W. Savage
ATTORNEY

Patented Nov. 7, 1939

2,179,353

UNITED STATES PATENT OFFICE 2,179,353

VOLTAGE STABILIZING NETWORK

Oskar Schmutz, Berlin-Haselhorst, and Otto Werner, Klein-Machnow, Kreis Teltow, Germany, assignors to Westinghouse Electric & Manufacturing Company, East Pittsburgh, Pa., a corporation of Pennsylvania Application March 20, 1937, Serial No. 132,064
In Germany March 24, 1936

4 Claims. (Cl. 171—119)

Our invention relates to a voltage stabilizing network.

It is well known in the art to maintain alternating voltages at a constant value by employing a network arrangement which consists of a series connected regulating reactor with air gap and a saturable reactor connected across the line in parallel circuit relation to a capacitor.

Figure 1:
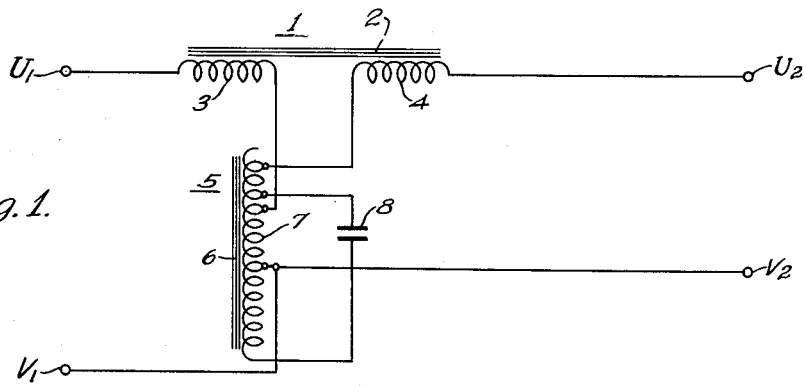
Fig. 1 is a diagrammatic view of circuits and apparatus illustrating a network known in the prior art.

Fig. 1 shows diagrammatically such a network. The voltage to be maintained at a constant value is supplied to the network through conductors $U_1$ and $V_1$. The regulating reactor 1 consists of an iron core 2 with air gap and of two windings 3 and 4. The shunt reactor 5 consists of an iron core 6 and a winding 7 having a plurality of branches. A capacitor 8 is connected in parallel relation to the winding 7 or to a portion thereof. The voltage to be kept at a constant value is taken from $U_2$ and $V_2$. In operation the disadvantage is, however, presented in that in the case of alternating-current voltage with variable wattless current the voltage remains no longer constant but depends largely upon the magnitude of the wattless current. This is primarily due to the reactance of the regulating reactor.

According to the invention a series-capacitor is, therefore, provided which is so dimensioned that its capacity reactance is equal or approximately equal to the series inductive reactance of the regulating reactor of the network. The series capacitor is connected in the output circuit of a network consisting of a series connected regulating reactor and a saturable reactor connected between the input circuit conductors termed a shunt reactor. A capacitor is connected in parallel relation to the winding of the shunt reactor and a part of the turns of this reactor are included in the output circuit. The series capacitor may be connected either directly in series in the output circuit or to the secondary winding of a current transformer, the primary winding of which is connected in series with the output circuit.

Figure 2:
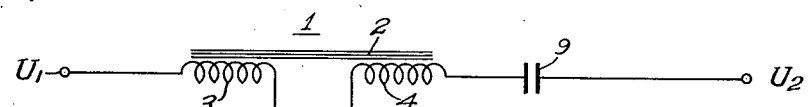
Fig. 2 is a diagrammatic view of circuits and apparatus illustrating a network organized in accordance with the invention.

Fig. 2 shows the arrangement of this capacitor in diagrammatic form. The connection of Fig. 2 differs from that shown in Fig. 1 in that a condenser 9 is arranged in series with the demagnetizing reactor 1.

Figure 3:
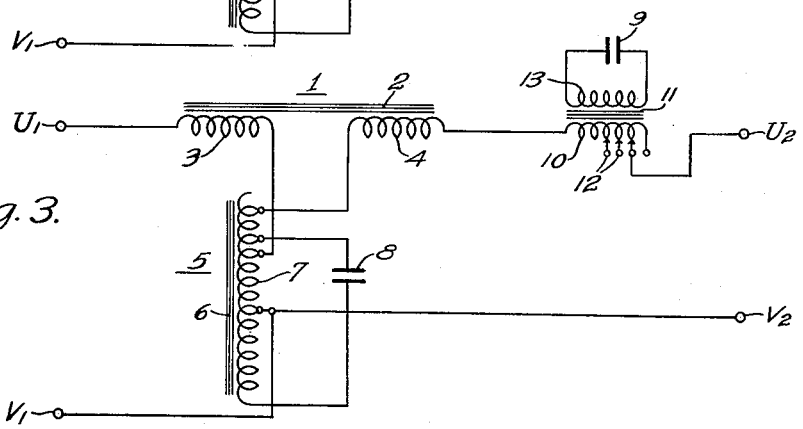
Fig. 3 is a modification of the arrangement illustrated in Fig. 2.

In some cases it is preferable not to insert the capacitor 9 directly in the circuit but to couple it through a current transformer. Fig. 3 shows such an embodiment. The primary winding 10 of a transformer 11 is inserted between the terminal $U_2$ and the winding 4 of the regulating reactor 1. The primary winding or the secondary winding may be conveniently provided with various taps 12 in order to balance the apparent resistance of the current transformer. The capacitor 9 is connected to the ends of the secondary winding 13 of the current transformer 11. It may also be convenient to design the current transformer in such a manner as to operate at small overloads in the zone of saturation.

We claim as our invention:

1. In a voltage stabilizing network, in combination, a series reactor comprising a core having an air gap therein and two windings thereon, and a saturable reactor comprising a core and a winding thereon, a capacitor connected in parallel circuit relation to a portion of the winding turns of said saturable reactor, an input circuit including a winding of the series reactor and a portion, at least, of the winding turns of said saturable reactor, an output circuit including a portion of the winding turns of said saturable reactor and the other winding of said series reactor, and a capacitor connected in series with said series reactor in the output circuit so dimensioned that its capacity reactance is substantially equal to the inductive reactance of the series reactor.

2. In a voltage stabilizing network, in combination, a series reactor comprising a core having an air gap therein and two windings thereon, and a saturable reactor comprising a core and a winding thereon, a capacitor connected in parallel circuit relation to a portion of the winding turns of said saturable reactor, an input circuit including a winding of the series reactor and a portion, at least, of the winding turns of said saturable reactor, an output circuit including the other winding of said series reactor, and a current transformer having its primary winding connected in the output circuit and its secondary winding connected to a capacitor so dimensioned that its capacity reactance is substantially equal to the inductive reactance of the series reactor.

3. In a voltage stabilizing network, in combination, a series reactor comprising a core having an air gap therein and two windings thereon, and a saturable reactor comprising a core and a winding thereon, a capacitor connected in parallel circuit relation to a portion of the winding turns of said saturable reactor, an input circuit including a winding of the series reactor and a portion, at least, of the winding turns of said saturable reactor, an output circuit including the other winding of said series reactor, and a current transformer having its primary winding connected in the output circuit and its secondary winding connected to a capacitor so dimensioned that its capacity reactance is substantially equal to the inductive reactance of the series reactor, the transformer being so dimensioned that it saturates at a low value of overload current.

4. In a voltage stabilizing network, in combination, a series reactor comprising a core having an air gap therein and two windings thereon, and a saturable reactor comprising a core and a winding thereon, a capacitor connected in parallel circuit relation to a portion of the winding turns of said saturable reactor, an input circuit including a winding of the series reactor and a portion, at least, of the winding turns of said saturable reactor, an output circuit including the other winding of said series reactor, and a current transformer having its primary winding connected in the output circuit and its secondary winding connected to a capacitor so dimensioned that its capacity reactance is substantially equal to the inductive reactance of the series reactor, the transformer being so dimensioned that it saturates at low value of overload current and provided with a plurality of taps for balancing the apparent reactance.

OSKAR SCHMUTZ.
OTTO WERNER.